United States Patent
Ozono et al.

(10) Patent No.: US 10,753,466 B2
(45) Date of Patent: Aug. 25, 2020

(54) TRANSMISSION CONTROL DEVICE AND TRANSMISSION CONTROL METHOD

(71) Applicants: JATCO Ltd, Fuji-shi, Shizuoka (JP); NISSAN MOTOR CO., LTD., Yokohama-shi, Kanagawa (JP)

(72) Inventors: Haruka Ozono, Hadano (JP); Youji Itou, Sagamihara (JP); Kosuke Abe, Isehara (JP)

(73) Assignees: JATCO LTD, Fuji-Shi (JP); NISSAN MOTOR CO., LTD., Yokohama-Shi (JP)

(*) Notice: Subject to any disclaimer, the term of this patent is extended or adjusted under 35 U.S.C. 154(b) by 454 days.

(21) Appl. No.: 15/559,029

(22) PCT Filed: Feb. 17, 2016

(86) PCT No.: PCT/JP2016/054592
§ 371 (c)(1),
(2) Date: Sep. 15, 2017

(87) PCT Pub. No.: WO2161/152333
PCT Pub. Date: Sep. 29, 2016

(65) Prior Publication Data
US 2018/0080548 A1  Mar. 22, 2018

(30) Foreign Application Priority Data
Mar. 20, 2015 (JP) .................. 2015-057904

(51) Int. Cl.
*F16H 61/12*  (2010.01)
*F16H 9/18*  (2006.01)
(Continued)

(52) U.S. Cl.
CPC ............... *F16H 61/12* (2013.01); *F16H 9/18* (2013.01); *F16H 61/0021* (2013.01);
(Continued)

(58) Field of Classification Search
CPC ..... F16H 2061/1224; F16H 2061/1232; F16H 2061/1284; F16H 61/12; F16H 59/40;
(Continued)

(56) References Cited

U.S. PATENT DOCUMENTS

| 6,073,072 A * | 6/2000 | Ishii | F16H 61/12 |
| | | | 701/63 |
| 2005/0192153 A1* | 9/2005 | Jozaki | F16H 61/12 |
| | | | 477/45 |

(Continued)

FOREIGN PATENT DOCUMENTS

| JP | 05-046465 B | 7/1993 |
| JP | 2006-090403 A | 4/2006 |
| WO | WO-2013/140841 A1 | 9/2013 |

*Primary Examiner* — Jacob S. Scott
(74) *Attorney, Agent, or Firm* — Foley & Lardner LLP

(57) ABSTRACT

In a transmission control device for controlling a transmission, a controller determines failure of a specific section. The controller variably controls line command pressure and secondary command pressure, and in a case where the failure is determined, fixes the line command pressure to a line pressure set value and the secondary command pressure to a secondary pressure set value. In a case where the failure is determined, the controller further starts a change in the secondary command pressure after start of a change in the line command pressure, and controls the secondary command pressure in such a manner that the secondary command pressure takes a first predetermined time to have the secondary pressure set value.

7 Claims, 6 Drawing Sheets

(51) Int. Cl.
*F16H 61/662* (2006.01)
*F16H 59/40* (2006.01)
*F16H 59/42* (2006.01)
*F16H 61/00* (2006.01)

(52) U.S. Cl.
CPC ........... *F16H 61/662* (2013.01); *F16H 59/40* (2013.01); *F16H 59/42* (2013.01); *F16H 2061/1232* (2013.01); *F16H 2061/1284* (2013.01)

(58) Field of Classification Search
CPC ...... F16H 59/42; F16H 61/0021; F16H 61/66; F16H 61/662; F16H 2061/66204; F16H 2061/66218; F16H 2061/66236; F16H 9/16; F16H 9/18
See application file for complete search history.

(56) References Cited

U.S. PATENT DOCUMENTS

2006/0063641 A1    3/2006   Oshita et al.
2014/0050601 A1    2/2014   Matsui et al.

* cited by examiner

TRANSMISSION CONTROL DEVICE AND TRANSMISSION CONTROL METHOD

TECHNICAL FIELD

The present invention relates to a transmission control device for controlling a transmission and a transmission control method for controlling a transmission.

BACKGROUND ART

A technique of performing a fail-safe at the time of failure in a rotation speed sensor of a secondary pulley of a continuously variable transmission is disclosed in JP5-46465B. In this technique, the continuously variable transmission is shifted by a single pressure regulation method of fixing control pressure of the secondary pulley to line pressure. In this technique, at the time of failure in the rotation speed sensor of the secondary pulley, the line pressure transmitted straightaway as the control pressure of the secondary pulley is fixed to the maximum value. In this technique, control pressure of a primary pulley generated from the line pressure is made to have the minimum value and a speed ratio is fixed to the maximum speed ratio, that is, the lowest speed ratio. Thereby, belt slippage is prevented in this technique.

SUMMARY OF INVENTION

In the technique of JP5-46465B, by fixing the line pressure to the maximum value at the time of failure, the control pressure of the secondary pulley can be radically increased. As a result, due to a radical change in the speed ratio at the time of the failure, there is a fear that uncomfortable feeling is given to a driver of a vehicle on which the continuously variable transmission is mounted.

The present invention is achieved in consideration of such a technical problem, and an object thereof is to provide a transmission control device for controlling a transmission and a transmission control method for controlling a transmission capable of suppressing a radical change in a speed ratio upon performing a fail-safe at the time of failure of a specific section.

A transmission control device for controlling a transmission in a first aspect serving as one aspect of the present invention is adapted to control the transmission having a variator at least having a pulley whose groove width is changed by controlling pulley pressure and a belt looped over the pulley, a hydraulic line-pressure actuator adapted to control actual pressure of line pressure serving as source pressure of the pulley pressure, and a hydraulic pulley-pressure actuator adapted to control actual pressure of the pulley pressure. The transmission control device has a failure determination unit adapted to determine failure of a specific section, a line command pressure control unit adapted to variably control line command pressure serving as command pressure to the hydraulic line-pressure actuator, and in a case where the failure is determined, to fix the line command pressure to a line pressure set value which is a first predetermined value or more, and a pulley command pressure control unit adapted to variably control pulley command pressure serving as command pressure to the hydraulic pulley-pressure actuator, and in a case where the failure is determined, to fix the pulley command pressure to a pulley pressure set value which is a second predetermined value or more. In a case where the failure is determined, the pulley command pressure control unit starts a change in the pulley command pressure after start of a change in the line command pressure, and controls the pulley command pressure in such a manner that the pulley command pressure takes a first predetermined time to have the pulley pressure set value.

According to a second aspect serving as another aspect of the present invention, a transmission control device is adapted to control a transmission. The transmission includes: a variator having a primary pulley whose groove width is changed by controlling primary pressure, a secondary pulley whose groove width is changed by controlling secondary pressure, and a belt looped over the primary pulley and the secondary pulley; a hydraulic line-pressure actuator adapted to control actual pressure of line pressure serving as source pressure of the primary pressure and the secondary pressure; a hydraulic primary-pressure actuator adapted to control actual pressure of the primary pressure; and a hydraulic secondary-pressure actuator adapted to control actual pressure of the secondary pressure. The transmission control device having the following configuration is provided, that is, the transmission control device includes: a failure determination unit adapted to determine failure of a specific section; a line command pressure control unit adapted to variably control line command pressure serving as command pressure to the hydraulic line-pressure actuator, and in a case where the failure is determined, to fix the line command pressure to a line pressure set value which is a first predetermined value or more; a primary command pressure control unit adapted to variably control primary command pressure serving as command pressure to the hydraulic primary-pressure actuator, and in a case where the failure is determined, to fix the primary command pressure to a primary pressure set value which is a third predetermined value or more; and a secondary command pressure control unit adapted to variably control secondary command pressure serving as command pressure to the hydraulic secondary-pressure actuator, and in a case where the failure is determined, to fix the secondary command pressure to a secondary pressure set value which is a fourth predetermined value or more. In a case where the failure is determined, the primary command pressure control unit starts a change in the primary command pressure after start of a change in the line command pressure, and controls the primary command pressure in such a manner that the primary command pressure takes a second predetermined time to have the primary pressure set value. In a case where the failure is determined, the secondary command pressure control unit starts a change in the secondary command pressure after start of the change in the line command pressure, and controls the secondary command pressure in such a manner that the secondary command pressure takes a third predetermined time to have the secondary pressure set value. In a case where the failure is determined, the primary command pressure control unit further starts the change in the primary command pressure before start or after start of the change in the secondary command pressure.

According to a third aspect serving as another aspect of the present invention, a transmission control method controls a transmission. The transmission includes: a variator having at least a pulley whose groove width is changed by controlling pulley pressure and a belt looped over the pulley; a hydraulic line-pressure actuator adapted to control actual pressure of line pressure serving as source pressure of the pulley pressure; and a hydraulic pulley-pressure actuator adapted to control actual pressure of the pulley pressure. The transmission control method includes: determining failure of a specific section; variably controlling line command pressure serving as command pressure to the hydraulic line-pressure actuator, and in a case where the failure is determined, fixing the line command pressure to a line pressure set value which is a first predetermined value or more; and variably controlling pulley command pressure serving as command pressure to the hydraulic pulley-pressure actuator, and in a case where the failure is determined, fixing the pulley command pressure to a pulley pressure set value which is a second predetermined value or more, wherein upon controlling the pulley command pressure, in a case where the failure is determined, a change in the pulley command pressure is started after start of a change in the line command pressure, and the pulley command pressure is controlled in such a manner that the pulley command pressure takes a first predetermined time to have the pulley pressure set value.

According to the first and third aspects, in a case where the failure is determined, the line command pressure is fixed to the line pressure set value and the pulley command pressure is fixed to the pulley pressure set value. Thus, the actual pressure of the line pressure and the actual pressure of the pulley pressure can be increased. Therefore, a fail-safe that suppresses generation of belt slippage can be performed. The same is applied to the second aspect.

Upon performing the fail-safe in such a way, in the first and third aspects, in a case where the failure is determined, the change in the pulley command pressure is started after start of the change in the line command pressure. Therefore, according to the first and third aspects, a timing of starting the change to the set value is differentiated between the line command pressure and the pulley command pressure. Thus, a radical change in the pulley pressure can be hindered. The same is applied to the second aspect.

Further, in the first and third aspects, the pulley command pressure is controlled in such a manner that the pulley command pressure takes the first predetermined time to have the pulley pressure set value. Therefore, according to the first and third aspects, at least the pulley pressure to be increased at last in the fail-safe is gradually changed. Thus, the speed ratio can be gradually changed. The same is applied to the second aspect.

Therefore, according to these aspects, upon performing the fail-safe at the time of the failure of the specific section, a radical change in the speed ratio can be suppressed.

DESCRIPTION OF EMBODIMENTS

Hereinafter, an embodiment of the present invention will be described with reference to the attached drawings. In this description, the expression "actual pressure" is mainly used for emphasizing that the pressure is actual pressure or for making a distinction from command pressure. Therefore, in this description, even when the pressure is actual pressure, the pressure is sometimes not specifically called "actual pressure".

Figure 1:
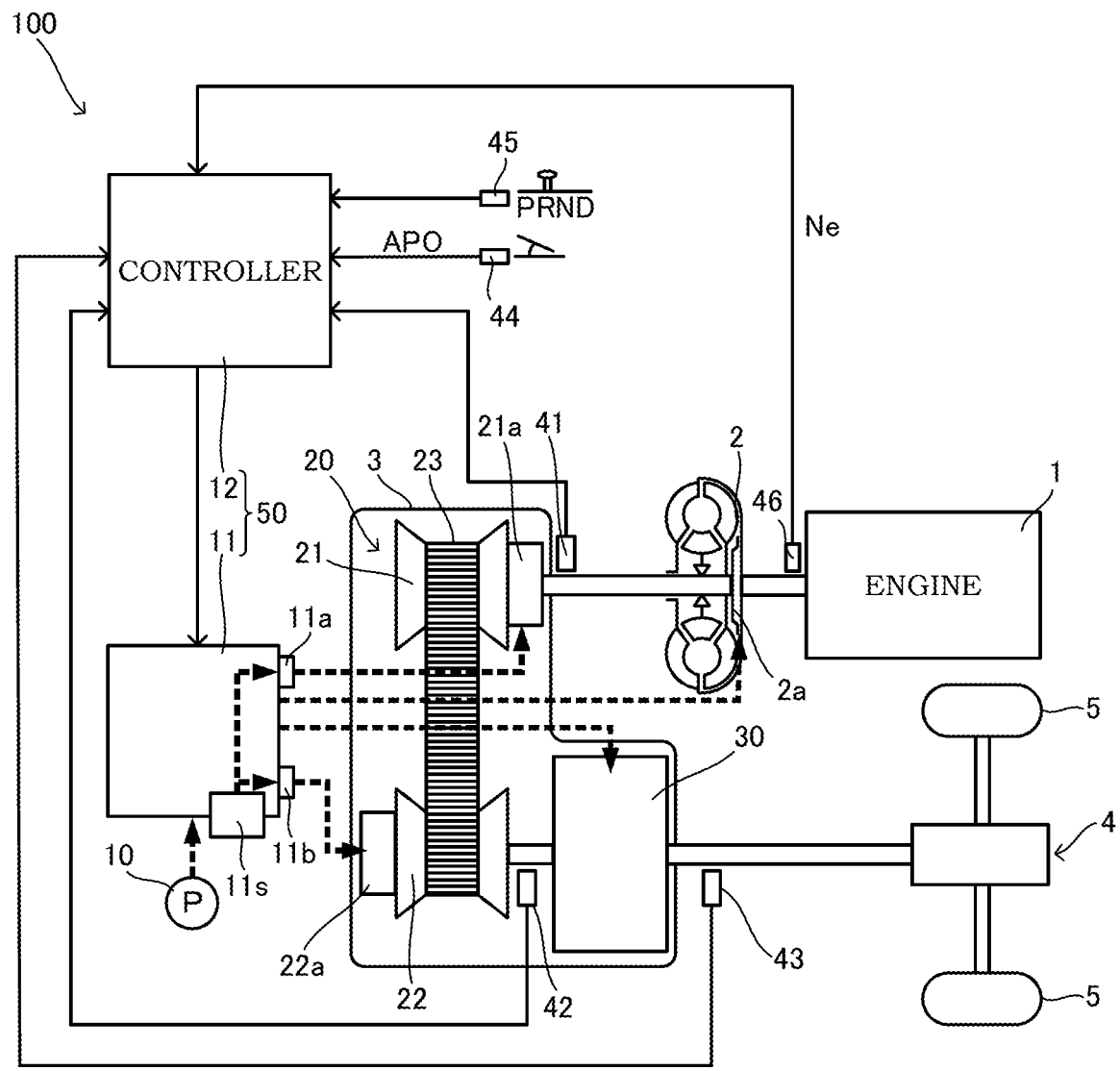
FIG. 1 is a diagram showing major portions of a vehicle including a transmission.

FIG. 1 is a diagram showing major portions of a vehicle including a transmission 100. The vehicle includes an engine 1, a torque converter 2, a variator 20, a sub-transmission mechanism 30, an axle 4, and drive wheels 5.

The engine 1 forms a power source of the vehicle. The torque converter 2 transmits power via a fluid. In the torque converter 2, by engaging a lock-up clutch 2a, power transmission efficiency can be enhanced. The variator 20 and the sub-transmission mechanism 30 output inputted rotation speed as rotation speed in accordance with a speed ratio. The speed ratio has a value obtained by dividing the inputted rotation speed by the outputted rotation speed. The axle 4 is a drive axle formed by a reduction gear and a differential device. The power of the engine 1 is transmitted to the drive wheels 5 via the torque converter 2, the variator 20, the sub-transmission mechanism 30, and the axle 4.

The variator 20 is a continuously variable transmission mechanism including a primary pulley 21, a secondary pulley 22, and a belt 23. Hereinafter, the primary pulley 21 will be also simply referred to as the pulley 21, and the secondary pulley 22 will be also simply referred to as the pulley 22.

The primary pulley 21 includes a fixed conical plate, a movable conical plate, and a hydraulic cylinder 21a. The secondary pulley 22 includes a fixed conical plate, a movable conical plate, and a hydraulic cylinder 22a. In each of the pulleys 21, 22, the fixed conical plate and the movable conical plate are arranged in a state where sheave surfaces face each other to form a V groove. In the pulley 21, the hydraulic cylinder 21a, or in the pulley 22, the hydraulic cylinder 22a is provided on a back surface of the movable conical plate to displace the movable conical plate in the axial direction. The belt 23 is looped over the pulley 21 and the pulley 22. A V belt can be used as the belt 23.

Primary pressure serving as control pressure of the primary pulley 21 acts on the hydraulic cylinder 21a. Secondary pressure serving as control pressure of the secondary pulley 22 acts on the hydraulic cylinder 22a. Both the primary pressure and the secondary pressure are one example of pulley pressure serving as control pressure of a pulley.

In the pulley 21, width of the V groove is changed by controlling the primary pressure. In the pulley 22, width of the V groove is changed by controlling the secondary pressure. By adjusting the primary pressure and changing the width of the V groove of the pulley 21, a contact radius of the pulley 21 and the belt 23 is changed. By adjusting the secondary pressure and changing the width of the V groove of the pulley 22, a contact radius of the pulley 22 and the belt 23 is changed. Therefore, by controlling the width of the V grooves of the pulley 21 and the pulley 22, the speed ratio of the variator 20 can be steplessly changed.

Since the variator 20 is formed in such a way, the variator is formed as a variator for the double pressure regulation method. The double pressure regulation method is a pressure regulation method in which a greater-than or less-than relationship is switched between the primary pressure and the secondary pressure. Therefore, in the double pressure regulation method, the greater-than or less-than relationship between the primary pressure and the secondary pressure includes a case of primary pressure>secondary pressure, a case of primary pressure=secondary pressure, and a case of primary pressure<secondary pressure. In the variator 20 adapted to perform shift by the double pressure regulation method, setting is made in such a manner that a pressure receiving area of the primary pulley 21 and a pressure receiving area of the secondary pulley 22 are equal. A return spring adapted to bias the movable conical plate is provided in the secondary pulley 22.

The sub-transmission mechanism 30 is a multi-gear transmission mechanism having gear positions of two forward gear positions and one backward gear position. The sub-transmission mechanism 30 has a first speed gear position and a second speed gear position whose speed ratio is less than the first speed gear position as the forward gear positions. The sub-transmission mechanism 30 is provided on the output side of the variator 20 in series in a power transmission path running from the engine 1 to the drive wheels 5. The sub-transmission mechanism 30 may be directly connected to the variator 20 or may be indirectly connected to the variator 20 via other configurations such as a gear train.

In the vehicle, the speed ratio is changed in each of the variator 20 and the sub-transmission mechanism 30. Therefore, in the vehicle, shift is performed in accordance with a through speed ratio which is a speed ratio of the entirety of the variator 20 and the sub-transmission mechanism 30 obtained by multiplying the speed ratio of the variator 20 by the speed ratio of the sub-transmission mechanism 30.

The variator 20 forms an automatic transmission mechanism 3 together with the sub-transmission mechanism 30. The variator 20 and the sub-transmission mechanism 30 may be formed as structurally individual transmission mechanisms.

The vehicle further includes an oil pump 10, a hydraulic control circuit 11, and a controller 12.

The oil pump 10 generates hydraulic pressure. A mechanical oil pump to be driven by the power of the engine 1 can be used as the oil pump 10.

The hydraulic control circuit 11 adjusts the hydraulic pressure generated by oil supply of the oil pump 10 and transmits to portions of the variator 20 and the sub-transmission mechanism 30. The hydraulic control circuit 11 includes a line pressure solenoid valve 11s, a primary pressure solenoid valve 11a, and a secondary pressure solenoid valve 11b. Hereinafter, the line pressure solenoid valve 11s will be referred to as the SOL 11s. The primary pressure solenoid valve 11a will be referred to as the SOL 11a, and the secondary pressure solenoid valve 11b will be referred to as the SOL 11b.

The SOL 11s is one example of a hydraulic line-pressure actuator adapted to control actual pressure of line pressure. The SOL 11s controls the actual pressure of the line pressure in accordance with line command pressure serving as command pressure to the SOL 11s. The line pressure is hydraulic pressure serving as source pressure of the primary pressure and the secondary pressure, the pressure being set in such a manner that slippage of the belt 23 is not generated.

Both the SOL 11a and the SOL 11b are one example of a hydraulic pulley-pressure actuator adapted to control actual pressure of the pulley pressure. Specifically, the SOL 11a is one example of a hydraulic primary-pressure actuator adapted to control actual pressure of the primary pressure. Specifically, the SOL 11b is one example of a hydraulic secondary-pressure actuator adapted to control actual pressure of the secondary pressure.

The SOL 11a controls the actual pressure of the primary pressure in accordance with primary command pressure serving as command pressure to the SOL 11a. The SOL 11b controls the actual pressure of the secondary pressure in accordance with secondary command pressure serving as command pressure to the SOL 11b. Both the primary command pressure and the secondary command pressure are one example of pulley command pressure serving as command pressure to the hydraulic pulley-pressure actuator.

Specifically, the following solenoid valve is used as the SOL 11s, the SOL 11a, and the SOL 11b. That is, a solenoid valve in which a linear solenoid actuator adapted to perform linear drive in accordance with the magnitude of an energized electric current is used in a solenoid portion is used. Alternatively, a solenoid valve in which a valve mechanism adapted to perform pressure regulation by changing the degree of drainage in accordance with the drive of the solenoid portion is used in a valve portion is used. In such a solenoid valve, a drainage port is fully closed in a case where the command pressure has the maximum value. A normal-high solenoid valve in which a command of energization stop is a command of command pressure of the maximum value is used as the SOL 11s, the SOL 11a, and the SOL 11b.

In the present embodiment, the SOL 11s is further combined with a line pressure control valve adapted to adjust the hydraulic pressure generated by the oil pump 10 to generate the line pressure. The SOL 11a is further combined with a primary pressure control valve adapted to generate the primary pressure from the line pressure, and the SOL 11b is further combined with a secondary pressure control valve adapted to generate the secondary pressure from the line pressure.

The SOL 11s of such a configuration controls the actual pressure of the line pressure by generating control pressure of the line pressure control valve, in other words, pilot pressure in accordance with the line command pressure, and controlling the line pressure control valve by the generated control pressure. That is, in the present embodiment, the SOL 11s has a linear solenoid valve adapted to generate the pilot pressure as the above solenoid valve, and has the line pressure control valve to be driven by the pilot pressure generated by the linear solenoid valve to generate the line pressure. The same is applied to the SOL 11a and the SOL 11b.

The controller 12 controls the hydraulic control circuit 11. Output signals of a rotation sensor 41, a rotation sensor 42, and a rotation sensor 43 are inputted to the controller 12. The rotation sensor 41 is a sensor corresponding to a variator input side rotation sensor for detecting rotation speed on the input side of the variator 20. The rotation sensor 42 is a sensor corresponding to a variator output side rotation sensor for detecting rotation speed on the output side of the variator 20. Specifically, the rotation sensor 42 detects the rotation speed on the output side of the variator 20 and on the input side of the sub-transmission mechanism 30. The rotation sensor 43 is a sensor corresponding to a sub-transmission mechanism output side rotation sensor for detecting rotation speed on the output side of the sub-transmission mechanism 30.

Specifically, the rotation speed on the input side of the variator 20 is rotation speed of an input shaft of the variator 20. The rotation speed on the input side of the variator 20 may be rotation speed at a position of the above power transmission path to sandwich, for example, a gear train with the variator 20. The same is applied to the rotation speed on the output side of the variator 20 and the rotation speed on the output side of the sub-transmission mechanism 30. The rotation sensor 41, the rotation sensor 42, and the rotation sensor 43 are used, for example, for detecting an actual speed ratio of the variator 20 and the sub-transmission mechanism 30.

In addition, output signals of an accelerator position sensor 44, an inhibitor switch 45, an engine rotation sensor 46, and the like are inputted to the controller 12. The accelerator position sensor 44 detects an accelerator position APO which represents an operation amount of an accelerator pedal. The inhibitor switch 45 is one example of a selection range detection unit adapted to detect a selection range of the transmission 100, and detects a position of a selector lever. The engine rotation sensor 46 detects rotation speed Ne of the engine 1. The controller 12 can detect vehicle speed VSP on the basis of the output signal of the rotation sensor 43.

The controller 12 generates a shift control signal on the basis of these signals. The shift control signal includes signals for giving a command for the line command pressure, the primary command pressure, and the secondary command pressure. Therefore, the controller 12 variably controls the line command pressure, the primary command pressure, and the secondary command pressure by generating the shift control signal on the basis of various signals described above. The controller 12 outputs the generated shift control signal to the hydraulic control circuit 11.

The hydraulic control circuit 11 controls the actual pressure of the line pressure, the primary pressure, and the secondary pressure on the basis of the shift control signal from the controller 12, and performs switching of a hydraulic path or the like. Specifically, the hydraulic control circuit 11 controls the actual pressure for each of the line pressure, the primary pressure, and the secondary pressure in such a manner that the actual pressure becomes the command pressure.

Thereby, the hydraulic pressure is transmitted from the hydraulic control circuit 11 to the portions of the variator 20 and the sub-transmission mechanism 30 in accordance with the shift control signal. As a result, the speed ratio of the variator 20 and the sub-transmission mechanism 30 is changed to be a speed ratio in accordance with the shift control signal, that is, a target speed ratio.

The target speed ratio can be set in accordance with the accelerator position APO and the vehicle speed VSP. The target speed ratio may be set in accordance with a throttle position TVO of a throttle valve adapted to adjust an intake air amount of the engine 1 instead of the accelerator position APO. The line command pressure, the primary command pressure, and the secondary command pressure can be set in accordance with the target speed ratio.

The transmission 100 is an automatic transmission having, in addition to the hydraulic control circuit 11 and the controller 12 adapted to control the speed ratio in such a way, the variator 20, the sub-transmission mechanism 30, the rotation sensor 41, the rotation sensor 42, the rotation sensor 43, and the inhibitor switch 45. The accelerator position sensor 44 and the engine rotation sensor 46 may be grasped as a configuration of the transmission 100.

Each of the rotation sensor 41, the rotation sensor 42, the rotation sensor 43, and the inhibitor switch 45 is one example of a detection unit used for control of the speed ratio of the transmission 100, and forms a specific section serving as an object whose failure is to be determined. The accelerator position sensor 44 and the engine rotation sensor 46 may also be grasped as the detection unit. The hydraulic control circuit 11 and the controller 12 form a transmission control device 50 adapted to perform control in the transmission 100. Hereinafter, the transmission control device 50 will be simply referred to as the control device 50.

Figure 2:
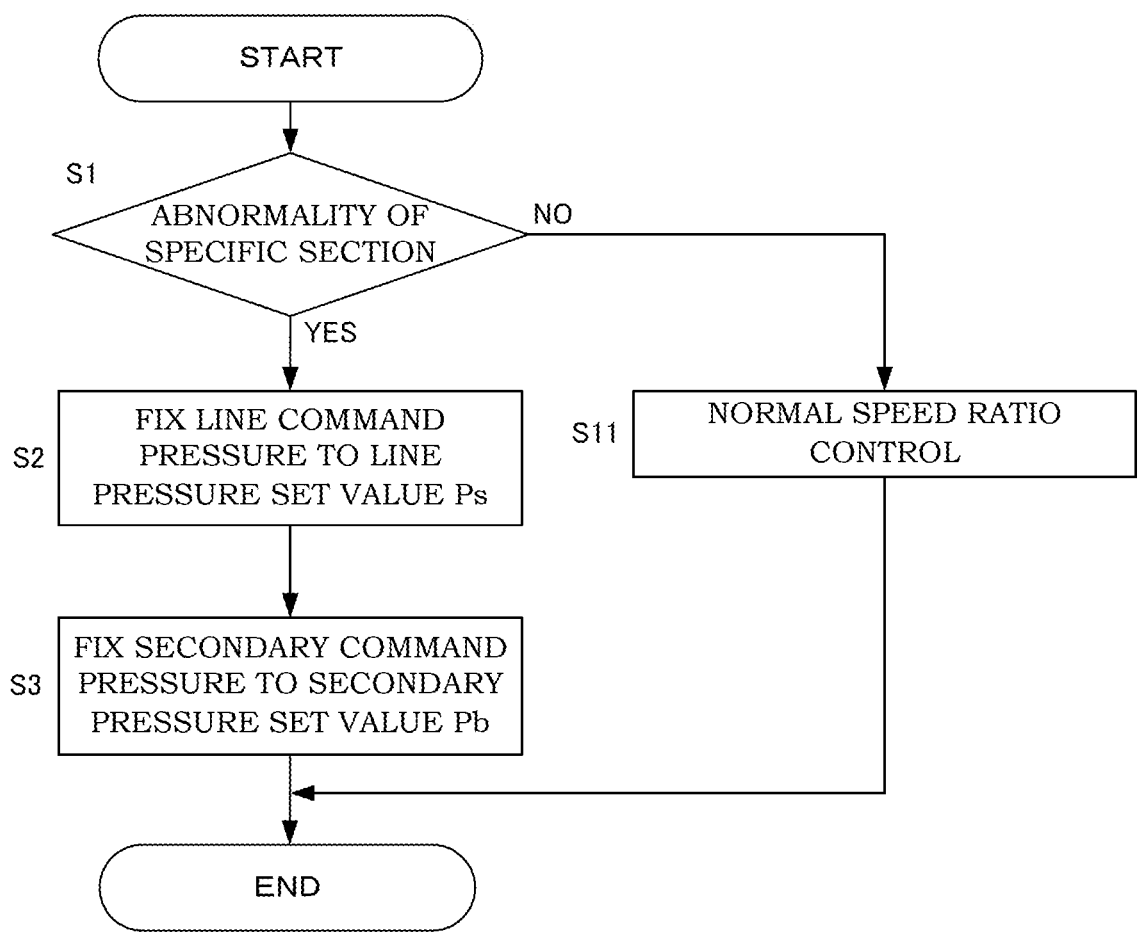
FIG. 2 is a flowchart showing one example of control performed by a controller.

FIG. 2 is a flowchart showing one example of the control performed by the controller 12. The controller 12 can repeatedly execute the process shown in this flowchart for every extremely-short time. In Step S1, the controller 12 determines whether or not the specific section is abnormal. In Step S1, the controller 12 can determine, for example, whether or not disconnection is caused in the specific section. The known technique and other appropriate techniques may be applied to the determination of whether or not the specific section is abnormal.

In Step S1, the controller 12 determines that the specific section is abnormal in a case where at least part of the specific section is abnormal. Specifically, the controller 12 determines that the specific section is abnormal in a case where at least any of the rotation sensor 41, the rotation sensor 42, the rotation sensor 43, and the inhibitor switch 45 is abnormal. When a negative determination is provided in Step S1, the process is forwarded to Step S11.

In Step S11, the controller 12 performs normal speed ratio control. In Step S11, the controller 12 controls the speed ratio of the variator 20 by variably controlling the line command pressure, the primary command pressure, and the secondary command pressure.

In Step S11, the line command pressure is controlled in accordance with input torque to the transmission 100 in such a manner that slippage of the belt 23 is not generated. The primary command pressure and the secondary command pressure are controlled in accordance with the target speed ratio in such a manner that the speed ratio of the variator 20 becomes the target speed ratio.

In Step S11, the primary command pressure and the secondary command pressure are further controlled in accordance with the input torque to the transmission 100. This is to control these command pressure in such a manner that slippage of the belt 23 is not generated by corresponding to the line command pressure controlled in such a manner that slippage of the belt 23 is not generated. After Step S11, the process of this flowchart is once ended.

When a positive determination is provided in Step S1, the process is forwarded to Step S2. In this case, the controller 12 fixes the line command pressure to a line pressure set value Ps. The line pressure set value Ps is a first predetermined value or more, and in the present embodiment, the maximum value of the line command pressure. The first predetermined value may be a value with which slippage of the belt 23 can be suppressed.

Specifically, in Step S2, the controller 12 controls the line command pressure in such a manner that the line command pressure takes a fourth predetermined time to have the line pressure set value Ps. The fourth predetermined time can be a time generated by making an inclination in a graph showing a change in the line command pressure in accordance with time in a case where the line command pressure does not have the line pressure set value Ps. The fourth predetermined time may be a time determined in accordance with such an inclination or the line command pressure at the time of starting the control of this step. In a case where the line command pressure originally has the line pressure set value Ps, the fourth predetermined time may be zero.

In Step S3, the controller 12 fixes the secondary command pressure to a secondary pressure set value Pb. The secondary pressure set value Pb is one example of a pulley pressure set value which is a second predetermined value or more. Specifically, the secondary pressure set value Pb is a fourth predetermined value or more, which is the second predetermined value for the secondary command pressure, and in the present embodiment, the secondary pressure set value Pb is the maximum value of the secondary command pressure.

The second predetermined value and the fourth predetermined value may be values with which slippage of the belt 23 can be suppressed.

Specifically, in Step S3, the controller 12 controls the secondary command pressure in such a manner that the secondary command pressure takes a first predetermined time, specifically, a third predetermined time which is the first predetermined time for the secondary command pressure to have the secondary pressure set value Pb. The first predetermined time and the third predetermined time are similar to the fourth predetermined time at the time of fixing the line command pressure to the line pressure set value Ps.

The controller 12 starts a change in the secondary command pressure serving as one example of the pulley command pressure after start of a change in the line command pressure by performing the process of Step S2 and successively performing the process of Step S3. After Step S3, the process of this flowchart is once ended.

Regarding Step S2, fixing the line command pressure to the line pressure set value Ps means that the line command pressure is maintained to have the line pressure set value Ps until the failure is removed by repair or the like. The same is applied to Step S3.

The control shown in FIG. 2 can also be applied to a case where the variator 20 is formed as a variator for the single pressure regulation method of fixing the primary pressure or the secondary pressure to the line pressure. The single pressure regulation method is a pressure regulation method in which a greater-than or less-than relationship is not switched between the primary pressure and the secondary pressure. Therefore, in the single pressure regulation method, the greater-than or less-than relationship between the primary pressure and the secondary pressure is maintained to be primary pressure secondary pressure or primary pressure secondary pressure.

In a case of the single pressure regulation method of fixing the primary pressure to the line pressure, the control shown in FIG. 2 can be applied straightaway. In a case of the single pressure regulation method of fixing the secondary pressure to the line pressure, the primary command pressure and a primary pressure set value Pa may be applied in Step S3 in place of the secondary command pressure and the secondary pressure set value Pb. The primary pressure set value Pa is one example of the pulley pressure set value as well as the secondary pressure set value Pb. Specifically, the primary pressure set value Pa is a third predetermined value or more, which is the second predetermined value for the primary command pressure, and in the present embodiment, the maximum value of the primary command pressure. The third predetermined value may be a value with which slippage of the belt 23 can be suppressed.

In a case of the transmission 100 in which the variator 20 is a variator for the double pressure regulation method, further specifically, the controller 12 can perform control in accordance with the object whose failure is to be determined as described below.

Figure 3:
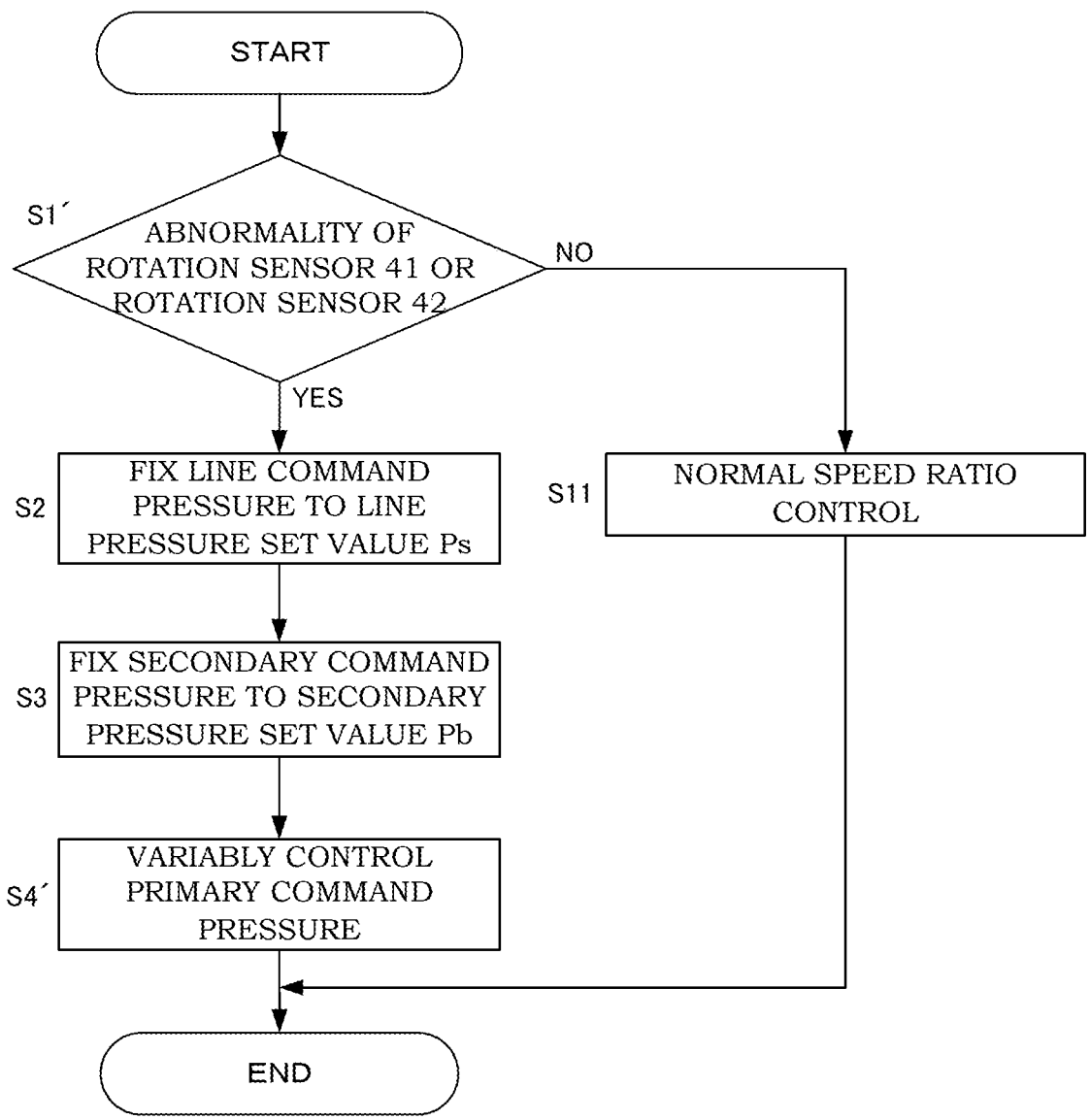
FIG. 3 is a flowchart showing a first specific example of the control performed by the controller.

FIG. 3 is a flowchart showing a first specific example of the control performed by the controller 12. This example shows a case where the rotation sensor 41 and the rotation sensor 42 are objects whose failure is to be determined. The object whose failure is to be determined may be at least any of the rotation sensor 41 and the rotation sensor 42.

In Step S1', the controller 12 determines whether or not the rotation sensor 41 or the rotation sensor 42 is abnormal. When a negative determination is provided in Step S1', the process is forwarded to Step S11. When a positive determination is provided in Step S1', the process is forwarded to Step S2 and then further forwarded to Step S3. After Step S3, the process is forwarded to Step S4'.

In Step S4', the controller 12 continuously changes the speed ratio of the variator 20 by variably controlling the primary command pressure. Specifically, the controller 12 continuously changes the speed ratio of the variator 20 by controlling the primary command pressure in accordance with the vehicle speed VSP. In Step S4', the controller 12 controls the primary command pressure by open-loop control.

In Step S4', the controller 12 can continuously change the speed ratio of the variator 20 within a range of a speed ratio region from the lowest speed ratio to the middle speed ratio by variably controlling the primary command pressure. Thereby, startability of the vehicle can be ensured. The middle speed ratio is an intermediate speed ratio with which the primary pressure and the secondary pressure are equal to each other. In Step S4', the controller 12 can variably control the primary command pressure in a mode not in accordance with the input torque to the transmission 100. After Step S4', the process of this flowchart is once ended.

The controller 12 starts a change in the primary command pressure after start of the change in the secondary command pressure by performing the process of Step S3 and successively performing the process of Step S4'. The controller 12 may start the change in the primary command pressure before start of the change in the secondary command pressure by performing the process of Step S4' before the process of Step S3.

The controller 12 may perform control in which the primary command pressure and the primary pressure set value Pa are applied in Step S3 in place of the secondary command pressure and the secondary pressure set value Pb and also perform control in which the secondary command pressure is applied in Step S4' in place of the primary command pressure. In this case, the speed ratio of the variator 20 can be continuously changed within a range of a speed ratio region from the middle speed ratio to the highest speed ratio. The highest speed ratio is the minimum speed ratio.

The control shown in FIG. 3 may be applied to a case where at least any of the rotation sensor 43 and the inhibitor switch 45 is the object whose failure is to be determined. In this case, at the time of failure of the rotation sensor 43, the primary command pressure can be controlled in accordance with the vehicle speed VSP by detecting the vehicle speed VSP on the basis of an output of other sensors such as a vehicle speed sensor used in an ABS (Antilock Brake System).

Figure 4:
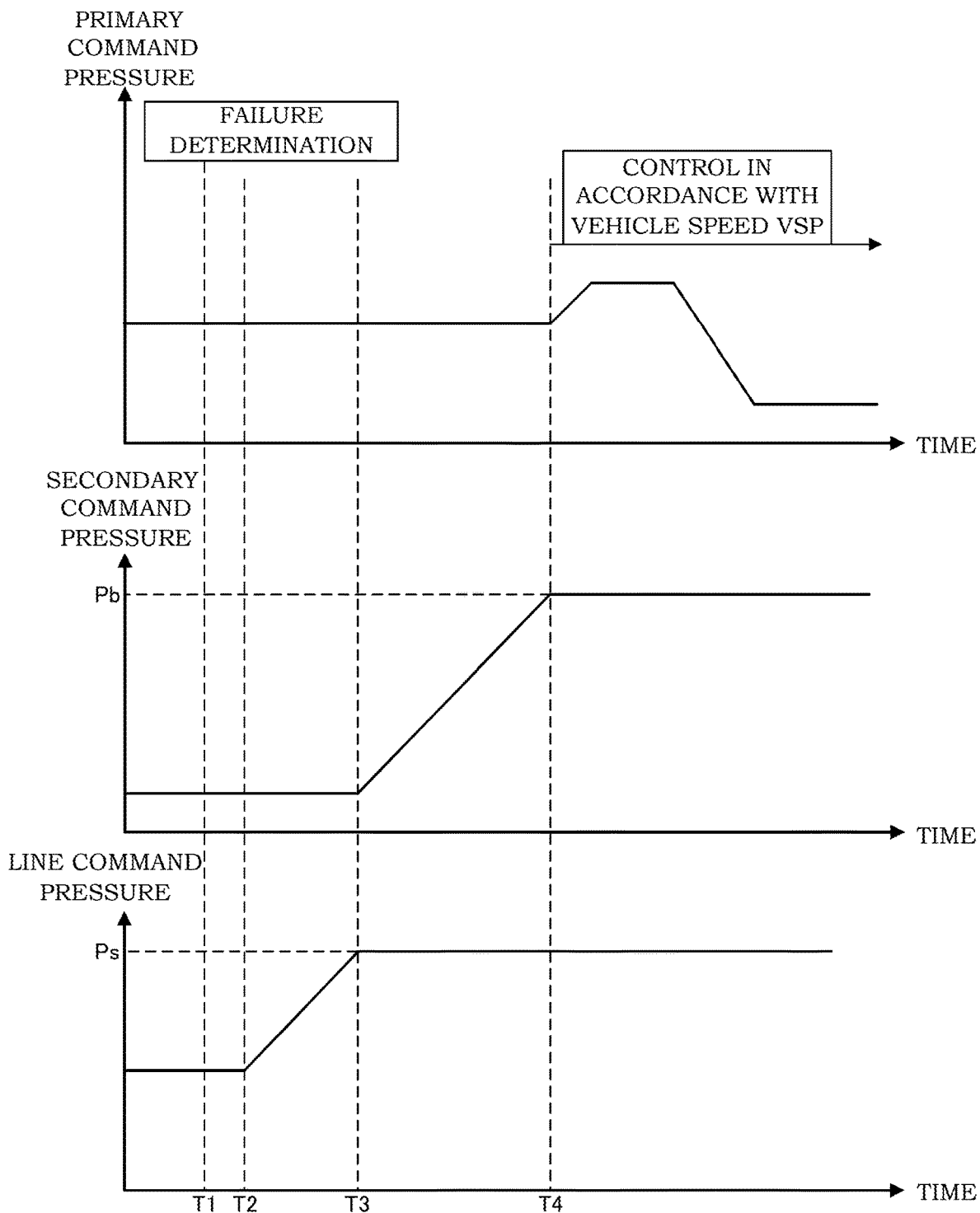
FIG. 4 is a diagram showing one example of a timing chart corresponding to the flowchart of FIG. 3.

FIG. 4 is a diagram showing one example of a timing chart corresponding to the flowchart of FIG. 3. FIG. 4 shows the primary command pressure, the secondary command pressure, and the line command pressure as parameters.

At a timing T1, the failure of the rotation sensor 41 or the rotation sensor 42 is determined. Therefore, the line command pressure is controlled to take the fourth predetermined time to have the line pressure set value Ps from a timing T2 which is the timing T1 or later. At this time, the line command pressure is controlled to be gradually increased. The line command pressure has the line pressure set value Ps at a timing T3 which is a timing after the timing T2. The line command pressure is fixed to the line pressure set value Ps at the timing T3 or later.

From the timing T3 forward, the secondary command pressure is controlled to take the third predetermined time to have the secondary pressure set value Pb. At this time, the secondary command pressure is controlled to be gradually increased. As shown in this example, the change in the secondary command pressure can be started, for example, after the line command pressure is fixed to the line pressure set value Ps. The change in the secondary command pressure may be started before the line command pressure is fixed to the line pressure set value Ps. The secondary command pressure has the secondary pressure set value Pb at a timing T4 which is a timing after the timing T3. The secondary command pressure is fixed to the secondary pressure set value Pb at the timing T4 or later.

From the timing T4 forward, the primary command pressure is controlled in accordance with the vehicle speed VSP. As shown in this example, control of the primary command pressure can be started after the line command pressure is fixed to the line pressure set value Ps and the secondary command pressure is fixed to the secondary pressure set value Pb.

Figure 5:
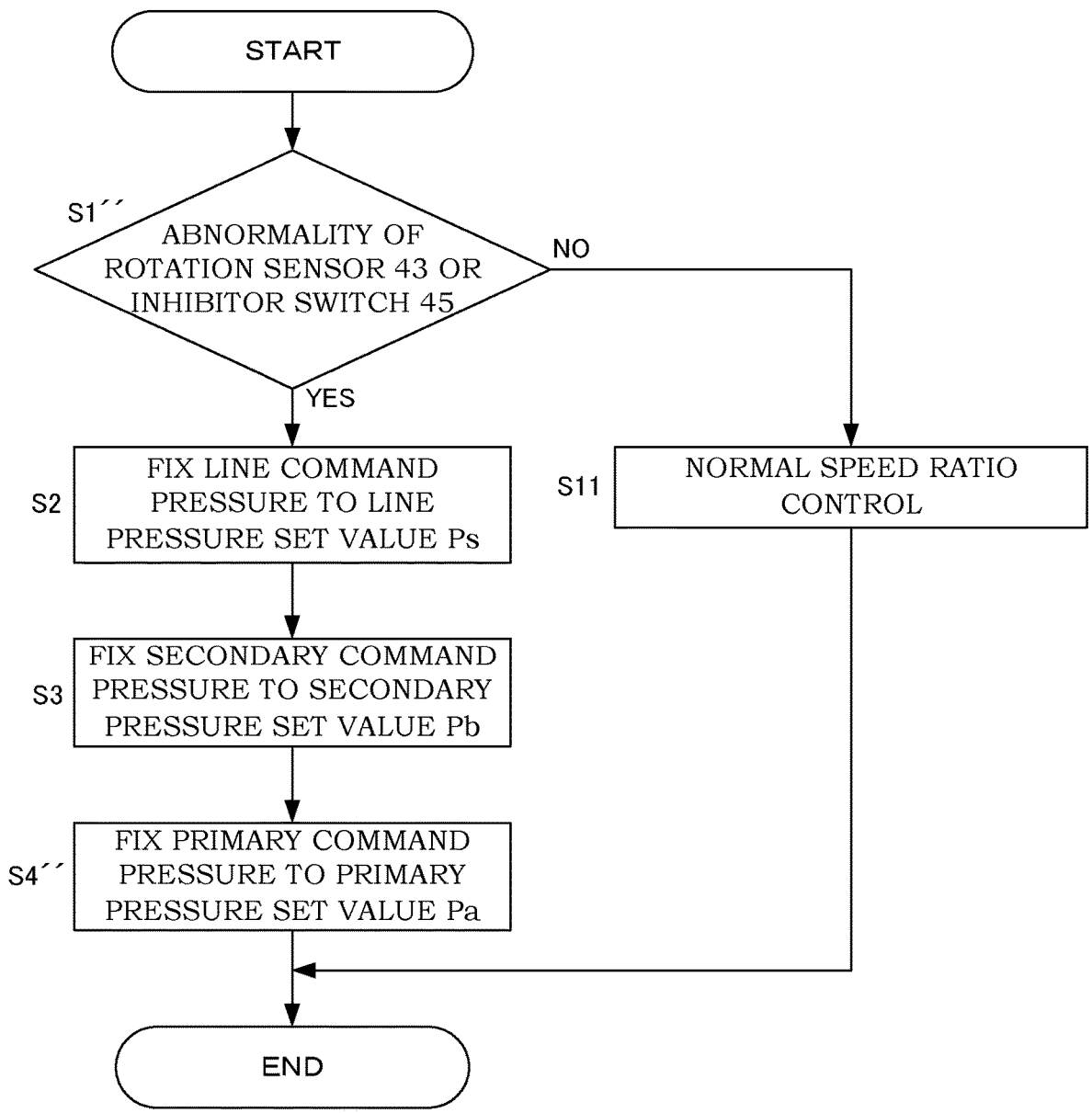
FIG. 5 is a flowchart showing a second specific example of the control performed by the controller.

FIG. 5 is a flowchart showing a second specific example of the control performed by the controller 12. This example shows a case where the rotation sensor 43 and the inhibitor switch 45 are objects whose failure is to be determined. The object whose failure is to be determined may be at least any of the rotation sensor 43 and the inhibitor switch 45.

In Step S1", the controller 12 determines whether or not the rotation sensor 43 or the inhibitor switch 45 is abnormal. When a negative determination is provided in Step S1", the process is forwarded to Step S11. When a positive determination is provided in Step S1", the process is forwarded to Step S2 and then further forwarded to Step S3. After Step S3, the process is forwarded to Step S4".

In Step S4", the controller 12 fixes the primary command pressure to the primary pressure set value Pa. Specifically, in Step S4", the controller 12 controls the primary command pressure in such a manner that the primary command pressure takes the first predetermined time, specifically, a second predetermined time which is the first predetermined time for the primary command pressure to have the primary pressure set value Pa. The second predetermined time is similar to the fourth predetermined time at the time of fixing the line command pressure to the line pressure set value Ps.

As well as the case of the first specific example described above, the controller 12 may start the change in the primary command pressure before start of the change in the secondary command pressure by performing the process of Step S4" before the process of Step S3.

The control shown in FIG. 5 may be applied to a case where at least any of the rotation sensor 41 and the rotation sensor 42 is the object whose failure is to be determined. That is, even in a case where the vehicle speed VSP can be detected on the basis of an output of the rotation sensor 43, the primary command pressure may be fixed to the primary pressure set value Pa.

Figure 6:
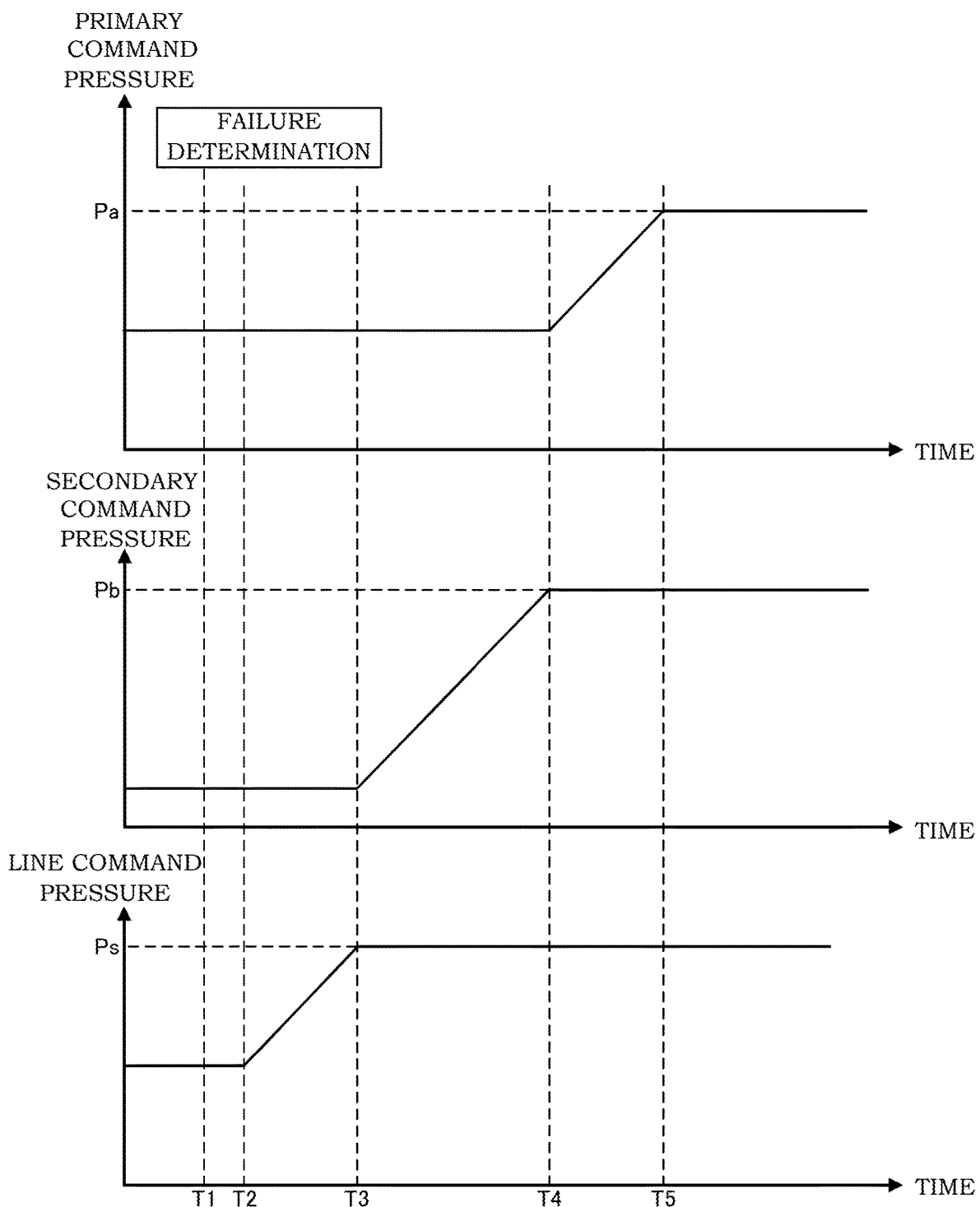
FIG. 6 is a diagram showing one example of a timing chart corresponding to the flowchart of FIG. 5.

FIG. 6 is a diagram showing one example of a timing chart corresponding to the flowchart of FIG. 5. FIG. 6 shows the primary command pressure, the secondary command pressure, and the line command pressure as parameters. A change from the timing T1 to the timing T4 is similar to the case of the first specific example shown in FIG. 4.

In a case of the second specific example, from the timing T4 forward, the primary command pressure is controlled to take the second predetermined time to have the primary pressure set value Pa. At this time, the primary command pressure is controlled to be gradually increased. The change in the primary command pressure is started after the timing T2, that is, after start of the change in the line command pressure. The change is also started after the secondary command pressure is fixed to the secondary pressure set value Pb. The change in the primary command pressure may be started before the secondary command pressure is fixed to the secondary pressure set value Pb. The primary command pressure has the primary pressure set value Pa at a timing T5 which is a timing after the timing T4. The primary command pressure is fixed to the primary pressure set value Pa at the timing T5 or later.

In the present embodiment, a failure determination unit is realized by the controller 12, specifically by part of the controller 12 functionally grasped as a portion that performs the determination of Step S1, Step S1', or Step S1" described above. A line command pressure control unit is realized by the controller 12, specifically by part of the controller 12 functionally grasped as a portion that performs the process of Step S2 and Step S11 described above. A pulley command pressure control unit is realized by the controller 12, specifically by part of the controller 12 functionally grasped as a portion that performs the process of Step S3 and Step S11, further Step S4' and Step S11, or Step S4" and Step 11 described above.

A primary command pressure control unit is realized by the controller 12, specifically by part of the controller 12 functionally grasped as a portion that performs the process of Step S4' and Step S11, or Step 4" and Step S11 described above. A secondary command pressure control unit is realized by the controller 12, specifically by part of the controller 12 functionally grasped as a portion that performs the process of Step S3 and Step S11 described above.

Next, major operations and effects of the control device 50 will be described. The control device 50 performs control in the transmission 100 having the variator 20 which has at least the secondary pulley 22 serving as one example of the pulley and the belt 23, the SOL 11s, and the SOL 11b serving as one example of the hydraulic pulley-pressure actuator. The control device 50 has the controller 12. The controller 12 determines the failure of the specific section. The controller 12 variably controls the line command pressure, and in a case where the failure is determined, fixes the line command pressure to the line pressure set value Ps. The controller 12 variably controls the secondary command pressure serving as one example of the pulley command pressure, and in a case where the failure is determined, fixes the secondary command pressure to the secondary pressure set value Pb serving as one example of the pulley pressure set value. Further, in a case where the failure is determined, the controller 12 starts the change in the secondary command pressure after start of the change in the line command pressure and controls the secondary command pressure in such a manner that the secondary command pressure takes the first predetermined time to have the secondary pressure set value Pb.

With the control device 50 of such a configuration, in a case where the failure is determined, the line command pressure is fixed to the line pressure set value Ps and the secondary command pressure is fixed to the secondary pressure set value Pb. Thus, the actual pressure of the line pressure and the actual pressure of the secondary pressure can be increased. Therefore, a fail-safe that suppresses generation of slippage of the belt 23 can be performed.

Upon performing the fail-safe in such a way, in the control device 50 of the above configuration, in a case where the failure is determined, the change in the secondary command pressure is started after start of the change in the line command pressure. Therefore, with the control device 50 of the above configuration, a timing of starting the change to the set value is differentiated between the line command pressure and the secondary command pressure. Thus, a radical change in the secondary pressure can be hindered.

Further, in the control device 50 of the above configuration, at least the secondary command pressure among the line command pressure and the secondary command pressure is controlled in such a manner that the command pressure takes a predetermined time to have the set value. Therefore, with the control device 50 of the above configuration, at least the secondary pressure to be increased at last in the fail-safe is gradually changed. Thus, the speed ratio can be gradually changed.

Therefore, with the control device 50 of such a configuration, upon performing the fail-safe at the time of the failure of the specific section, a radical change in the speed ratio can be suppressed.

The control device 50 performs the control in the transmission 100 having the variator 20 which has the primary pulley 21, the secondary pulley 22, and the belt 23, the SOL 11s, the SOL 11a, and the SOL 11b. The control device 50 has the controller 12. The controller 12 determines the failure of the specific section. The controller 12 variably controls the line command pressure, and in a case where the failure is determined, fixes the line command pressure to the line pressure set value Ps. The controller 12 variably controls the primary command pressure, and in a case where the failure is determined, fixes the primary command pressure to the primary pressure set value Pa. The controller 12 variably controls the secondary command pressure, and in a case where the failure is determined, fixes the secondary command pressure to the secondary pressure set value Pb. Further, the controller 12 performs the following control in a case where the failure is determined. That is, the controller 12 starts the change in the primary command pressure after start of the change in the line command pressure and controls the primary command pressure in such a manner that the primary command pressure takes the second predetermined time to have the primary pressure set value Pa. The controller 12 starts the change in the secondary command pressure after start of the change in the line command pressure and controls the secondary command pressure in such a manner that the secondary command pressure takes the third predetermined time to have the secondary pressure set value Pb. Further, the controller 12 starts the change in the primary command pressure before start or after start of the change in the secondary command pressure.

With the control device 50 of such a configuration, for each of the line command pressure, the primary command pressure, and the secondary command pressure, the command pressure is fixed to the set value. Thus, the fail-safe that suppresses generation of slippage of the belt 23 can be performed. With the control device 50 of such a configuration, for each of the primary pressure and the secondary pressure, a radical change in relation to the line pressure can be hindered and the pressure can be gradually changed. Therefore, with the control device 50 of such a configuration, in a case where shift is performed by the double pressure regulation method, upon performing the fail-safe at the time of the failure of the specific section, a radical change in the speed ratio can be suppressed.

Further, with the control device 50 of such a configuration, the timing of starting the change to the set value is differentiated between the primary command pressure and the secondary command pressure. Thus, a situation where the SOL 11a and the SOL 11b scramble for the line pressure and shortage in the supplied oil amount is generated can be suppressed.

In the SOL 11a, drainage is not performed in a case where the primary command pressure has the maximum value. Therefore, in this case, the line pressure serves as the primary pressure straightaway. The same is applied to the SOL 11b.

Therefore, in the control device 50, in a case where the failure is determined, the controller 12 controls the line command pressure in such a manner that the line command pressure takes the fourth predetermined time to have the line pressure set value Ps.

With the control device 50 of such a configuration, in a case where the primary command pressure or the secondary command pressure has the maximum value at the time of generation of the failure, a radical change in the primary pressure or the secondary pressure due to a radical change in the line pressure can be further prevented. Therefore, with the control device 50 of such a configuration, even in such a case, a radical change in the speed ratio can be suppressed.

In the control device 50, the specific section can be the rotation sensor 41, the rotation sensor 42, or the inhibitor switch 45. In this case, at the time of the failure of the rotation sensor 41, the rotation sensor 42, or the inhibitor switch 45, the fail-safe can be performed while suppressing a radical change in the speed ratio.

In the control device 50, the transmission 100 further includes the sub-transmission mechanism 30. In the control device 50 of such a configuration, the specific section can also be the rotation sensor 43. In this case, at the time of the failure of the rotation sensor 43, the fail-safe can be performed while suppressing a radical change in the speed ratio.

The embodiment of the present invention is described above. However, the above embodiment does not intend to limit the technical scope of the present invention to the specific configurations of the above embodiment but only indicates part of application examples of the present invention.

The control device 50 can be applied to a case where for the primary pressure or the secondary pressure, the command pressure is fixed to the set value in a case where the failure is determined. Therefore, a configuration other than the detection unit used for the control of the speed ratio of the transmission 100 such as a hydraulic actuator (for example, the SOL 11s, the SOL 11a, the SOL 11b, or a hydraulic step motor to be used in place of these) may be applied to the specific section.

This application claims priority based on Japanese Patent Application No. 2015-57904 filed with the Japan Patent Office on Mar. 20, 2015, the entire contents of which are incorporated into this specification.

The invention claimed is:

1. A transmission control device for controlling a transmission, the transmission having:
   a variator having at least a pulley whose groove width is changed by controlling a pulley pressure, and a belt looped over the pulley;
   a hydraulic line-pressure actuator adapted to control actual pressure of a line pressure serving as source pressure of the pulley pressure; and
   a hydraulic pulley-pressure actuator adapted to control actual pressure of the pulley pressure, wherein
   the transmission control device is adapted to:
      determine failure of a specific section;
      variably control a line command pressure serving as a command pressure to the hydraulic line-pressure actuator, and in a case where the failure is determined, to fix the line command pressure to a line pressure set value which is a first predetermined value or more; and variably control a pulley command pressure serving as a command pressure to the hydraulic pulley-pressure actuator, and in a case where the failure is determined, to fix the pulley command pressure to a pulley pressure set value which is a second predetermined value or more, and in a case where the failure is determined, starts a change in the pulley command pressure after start of a change in the line command pressure, and controls the pulley command pressure in such a manner that the pulley command pressure takes a first predetermined time to have the pulley pressure set value.

2. The transmission control device according to claim 1, wherein the variator includes a primary pulley whose groove width is changed by controlling a primary pressure, a secondary pulley whose groove width is changed by controlling a secondary pressure, and the belt looped over the primary pulley and the secondary pulley, the hydraulic line-pressure actuator adapted to control actual pressure of line pressure serving as source pressure of the primary pressure and the secondary pressure, the hydraulic pulley-pressure actuator includes a hydraulic primary-pressure actuator adapted to control actual pressure of the primary pressure, and a hydraulic secondary-pressure actuator adapted to control actual pressure of the secondary pressure, the transmission control device is adapted to:

variably control a primary command pressure serving as a command pressure to the hydraulic primary-pressure actuator, and in a case where the failure is determined, to fix the primary command pressure to a primary pressure set value which is a third predetermined value or more;

variably control a secondary command pressure serving as a command pressure to the hydraulic secondary-pressure actuator, and in a case where the failure is determined, to fix the secondary command pressure to a secondary pressure set value which is a fourth predetermined value or more;

in a case where the failure is determined, start a change in the primary command pressure after start of a change in the line command pressure, and control the primary command pressure in such a manner that the primary command pressure takes a second predetermined time to have the primary pressure set value;

in a case where the failure is determined, start a change in the secondary command pressure after start of the change in the line command pressure, and control the secondary command pressure in such a manner that the secondary command pressure takes a third predetermined time to have the secondary pressure set value; and in a case where the failure is determined, further start the change in the primary command pressure before start or after start of the change in the secondary command pressure.

3. The transmission control device according to claim 1, wherein the transmission control device is configured to, in a case where the failure is determined, control the line command pressure in such a manner that the line command pressure takes a fourth predetermined time to have the line pressure set value.

4. The transmission control device according to claim 1, wherein the specific section is a variator input side rotation sensor for detecting rotation speed on the input side of the variator, a variator output side rotation sensor for detecting rotation speed on the output side of the variator, or an inhibitor switch adapted to detect a selection range of the transmission.

5. The transmission control device according to claim 1, wherein the transmission further includes a sub-transmission mechanism arranged on the output side of the variator, the sub-transmission mechanism having a first gear position and a second gear position in which a speed ratio is smaller than the first gear position, and the specific section is a sub-transmission mechanism output side rotation sensor for detecting rotation speed on the output side of the sub-transmission mechanism.

6. A transmission control method for controlling a transmission, the transmission having:

a variator having at least a pulley whose groove width is changed by controlling a pulley pressure and a belt looped over the pulley;

a hydraulic line-pressure actuator adapted to control actual pressure of a line pressure serving as source pressure of the pulley pressure; and a hydraulic pulley-pressure actuator adapted to control actual pressure of the pulley pressure, the transmission control method comprising:

determining failure of a specific section;

variably controlling a line command pressure serving as a command pressure to the hydraulic line-pressure actuator, and in a case where the failure is determined, fixing the line command pressure to a line pressure set value which is a first predetermined value or more; and variably controlling a pulley command pressure serving as a command pressure to the hydraulic pulley-pressure actuator, and in a case where the failure is determined, fixing the pulley command pressure to a pulley pressure set value which is a second predetermined value or more, wherein upon controlling the pulley command pressure, in a case where the failure is determined, a change in the pulley command pressure is started after start of a change in the line command pressure, and the pulley command pressure is controlled in such a manner that the pulley command pressure takes a first predetermined time to have the pulley pressure set value.

7. A transmission control device for controlling a transmission, the transmission having:

a variator having at least a pulley whose groove width is changed by controlling a pulley pressure and a belt looped over the pulley;

a hydraulic line-pressure actuator adapted to control actual pressure of a line pressure serving as a source pressure of the pulley pressure; and a hydraulic pulley-pressure actuator adapted to control actual pressure of the pulley pressure, the transmission control device comprising:

failure determination means for determining failure of a specific section;

line command pressure control means for variably controlling a line command pressure serving as a command pressure to the hydraulic line-pressure actuator, and in a case where the failure is determined, to fix the line command pressure to a line pressure set value which is a first predetermined value or more; and pulley command pressure control means for variably controlling a pulley command pressure serving as a command pressure to the hydraulic pulley-pressure actuator, and in a case where the failure is determined, fixing the pulley command pressure to a pulley pressure set value which is a second predetermined value or more, wherein in a case where the failure is determined, the pulley command pressure control means for starting a change in the pulley command pressure after start of a change in the line command pressure, and controlling the pulley command pressure in such a manner that the pulley command pressure takes a first predetermined time to have the pulley pressure set value.

* * * * *